MAGNETIC SYSTEMS

Filed May 7, 1956

5 Sheets-Sheet 1

INVENTOR.
Hewitt D. Crane
BY
ATTORNEY.

May 9, 1961 H. D. CRANE 2,983,906
MAGNETIC SYSTEMS
Filed May 7, 1956 5 Sheets-Sheet 2

INVENTOR.
Hewitt D. Crane
BY Morris A. Rabkin
ATTORNEY.

May 9, 1961 H. D. CRANE 2,983,906

MAGNETIC SYSTEMS

Filed May 7, 1956 5 Sheets-Sheet 3

INVENTOR.
Hewitt D. Crane
BY Morris B. Rabkin
ATTORNEY.

INVENTOR.
Hewitt D. Crane
BY Morris A. Rabkin
ATTORNEY.

INVENTOR.
Hewitt D. Crane
BY Morris Rabkin
ATTORNEY.

United States Patent Office 2,983,906
Patented May 9, 1961

2,983,906

MAGNETIC SYSTEMS

Hewitt D. Crane, Menlo Park, Calif., assignor to Radio Corporation of America, a corporation of Delaware Filed May 7, 1956, Ser. No. 582,985

19 Claims. (Cl. 340—174)

This invention relates to magnetic systems, and particularly to improved magnetic switching systems using transfluxors.

The switching of electric signals to a utilization device can be controlled in an improved manner by using multi-apertured magnetic cores of rectangular hysteresis loop material. Arrangements of such multiapertured cores in switching systems are described in an article entitled "The Transfluxor" by J. A. Rajchman and A. W. Lo, published in the Proceedings of the IRE, March 1956, pages 321–332. As pointed out in this article, transfluxor systems can control the transmission of alternating (A.C.) electric signals to a load device. However, in the systems described in the article, maximum output may be obtained in only one of the phases of the A.C. signals; the output in the other phase of the A.C. signal is limited because this other phase may produce "spurious unblocking" of the transfluxor core. For most practical purposes, the systems as described in the aforesaid article furnish sufficient output for controlling the operation of, or for supplying signals to, devices connected in their output circuits. In certain applications, however, it is desirable to increase the amplitude of output of the other phase over what was formerly available. For example, in magnetic switch systems, it is often desirable to have relatively large amplitude symmetrical output signals of both polarities.

It is among the objects of the present invention to provide improved magnetic systems for controlling relatively large amplitude A.C. signals in an output circuit.

Another object of the present invention is to provide improved transfluxor systems for switching symmetrical bipolarity signals to a load device in accordance with a single setting signal.

Still another object of the present invention is to provide improved transfluxor systems which can operate to furnish relatively large symmetrical signals of both polarities to an output circuit.

The advantages of the present invention are achieved by using a transfluxor system having a core of rectangular hysteresis loop material with at least three apertures. One of these apertures is used for obtaining the blocking and setting functions of a transfluxor system, and the other two apertures are used respectively for obtaining the one and the other opposite polarity symmetrical outputs. The drive windings are linked to the core through the latter two apertures in a manner such that neither a drive signal nor an output signal produces "spurious" flux changes in the core. The output circuit is wound through the latter two apertures in a manner such that an output is obtained only when flux changes are produced in the flux path about a single one of these two apertures. Because "spurious" flux changes are inhibited, an increased amount of output can be obtained over that obtainable in prior systems.

In certain embodiments of the invention, the two apertures linked by the output circuit may be in separate cores of rectangular hysteresis loop material.

Another aspect of the present invention is that the priming operation described in the above-mentioned article may be carried out at higher speeds than formerly without providing "spurious" output signals.

These and other advantages of the invention will be more fully pointed out in the following description in connection with the accompanying drawing wherein like reference numerals are used to designate like parts, and wherein.

Figure 11:
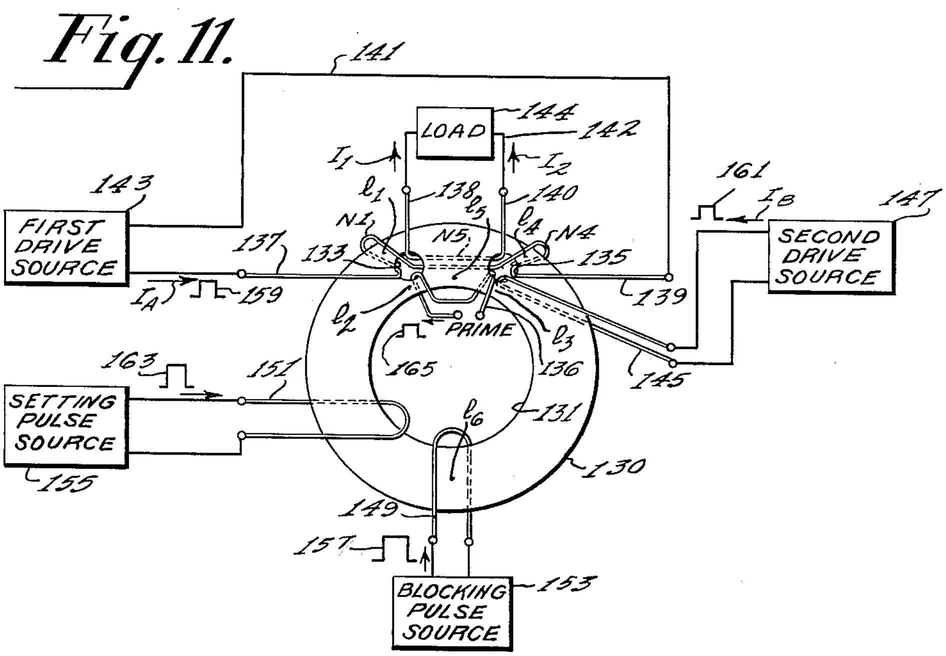
Figure 12:
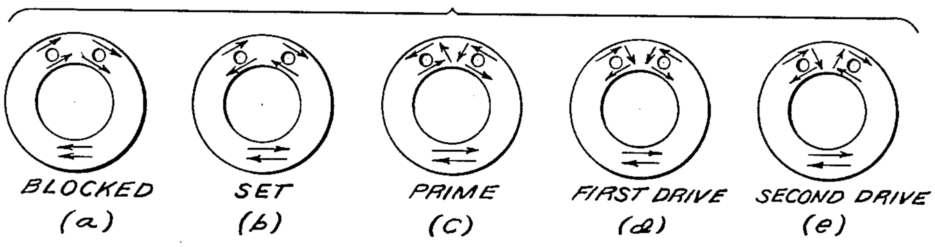
Figure 13:
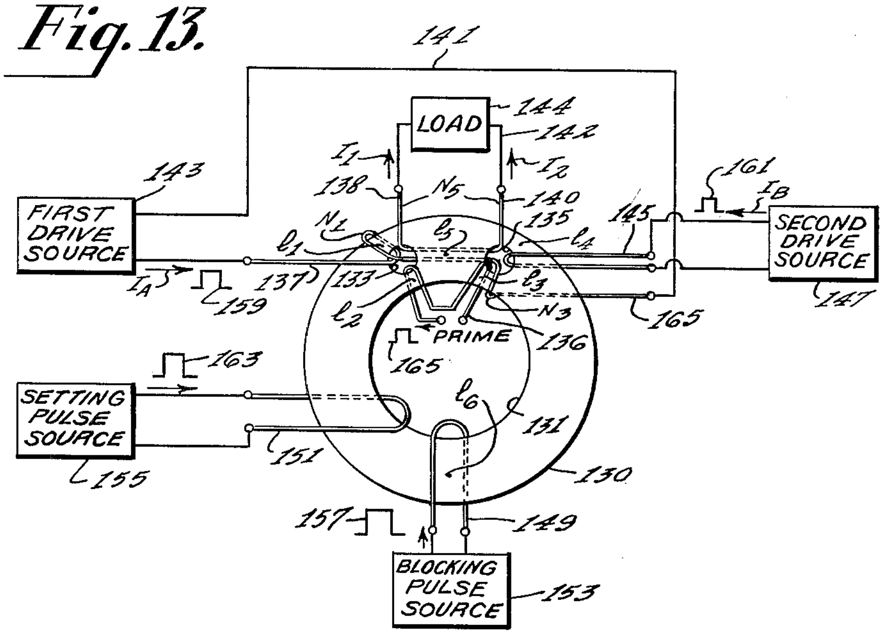
Figure 14:
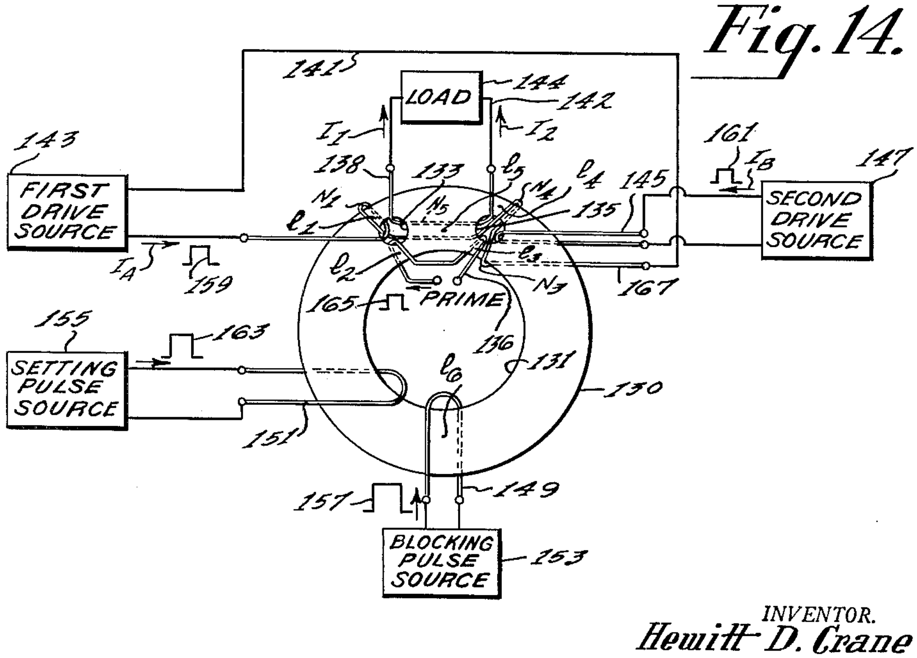

Figures 7 through 10, respectively, are schematic diagrams of different embodiments of the invention, each embodiment using two separate transfluxor cores and each employing different couplings of the various windings to the magnetic paths of the transfluxor cores;

Figure 11 is a schematic diagram of an embodiment of the invention using a single three-aperture transfluxor core;

Figures 12(*a*) through (*e*) are symbolic diagrams useful in explaining the operation of the system of Figure 11 and illustrating flux configurations established by various signals applied to the transfluxor core of Figure 11;

Figures 13 and 14 are, respectively, schematic diagrams of modifications of the invention using three-apertured transfluxors cores but each employing winding configurations different from the system of Figure 11.

Figure 1:
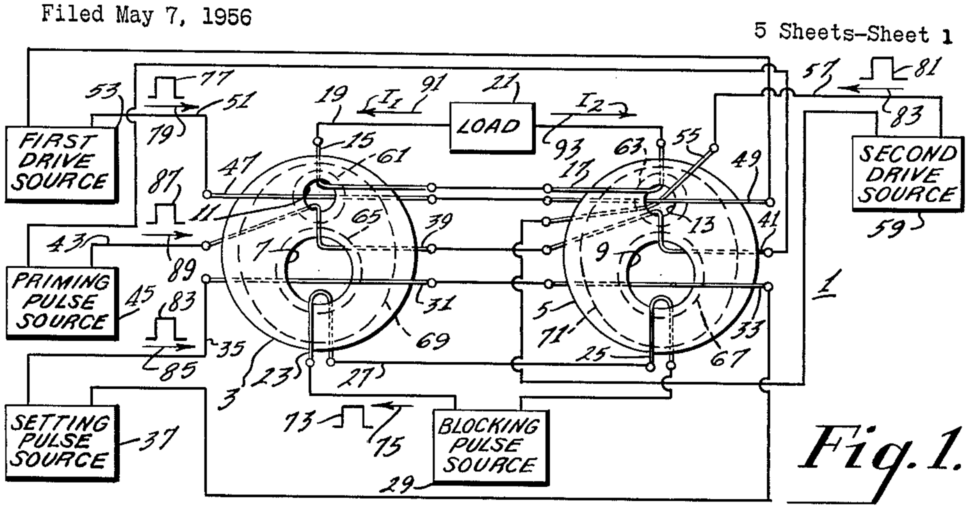
Figure 1 is a schematic diagram of a system for obtaining symmetrical output power, using two separate transfluxor cores.

Referring to Figure 1, the magnetic system 1 includes a pair of two-apertured transfluxor cores 3 and 5 each respectively having relatively large-diameter apertures, termed the blocking apertures 7 and 9, and the relatively small-diameter apertures termed the output apertures 11 and 13.

The transfluxor cores 3 and 5 are made from a magnetic material characterized by having a substantially rectangular hysteresis loop. A suitable magnetic material, for example, is manganese magnesium ferrite material. The relative dimensions of the materials of the transfluxor cores 3 and 5 may be, for example, .346 inch overall diameter and .140 inch thick, the blocking aperture having the dimension of .138 inch, offset .017 inch from the center of the disc, and the output aperture .043 inch in diameter and offset .1135 inch from the center of the disc. It is understood that the above dimensions are given for purposes of illustration and are not to be considered limitations of the invention, as transfluxor cores having other dimensions may be employed.

A pair of load windings 15 and 17 are linked to the respective output apertures 11 and 13. A load coil 19 connects the load windings 15 and 17 in a series circuit including a load device 21. A pair of blocking windings 23 and 25 are respectively linked through the blocking apertures 7 and 9. The blocking coil 27 connects the blocking windings 23 and 25 in series circuit including a blocking pulse source 29. A pair of setting windings 31 and 33 are respectively linked through the blocking apertures 7 and 9. A setting coil 35 connects the setting windings 31 and 33 in a series circuit including a setting pulse source 37. A pair of priming windings 39 and 41 may be linked through both apertures 7 and 11, and 13 and 9 of the respective transfluxor cores 3 and 5. A priming coil 43 connects the priming windings 39 and 41 in a series circuit including a priming pulse source 45. A pair of first drive windings 47 and 49 are respectively linked through the output apertures 11 and 13. A first drive coil 51 connects the first drive windings 47 and 49 in a series circuit including a first drive source 53. A second drive winding 55 is linked through the smaller aperture 13 of the transfluxor 5. A second drive coil 57 connects the second drive winding 55 in series with a second drive source 59.

For convenience of drawing, each of the respective windings linked through the transfluxor cores 3 and 5 are shown as single-turn windings. It is understood, however, that multiturn windings may be used.

Each of the sources 29, 37, 45, 53, and 59 of Figure 1, and the sources hereinafter described, is preferably a constant-current source. The load device 21 may be any suitable utilization device responsive to the signals induced in the load coil 19.

Three separate flux paths are provided in each of the transfluxor cores 3 and 5. These separate paths are indicated in the drawing by dotted lines about the apertures. The flux paths about the output apertures 11 and 13 are indicated by the dotted lines 61 and 63. The separate paths about the blocking apertures 7 and 9 are indicated by the dotted lines 65 and 67, and the remaining longer paths about the apertures 7, 11 and 9, 13 are indicated by the dotted lines 69 and 71.

The operation of systems using two-aperture transfluxor cores is described in the above-mentioned article by Jan A. Rajchman and Arthur W. Lo. The transfluxor system of Fig. 1 is placed in a blocked condition by a blocking pulse 73 applied to the blocking coil 27 by the blocking pulse source 29. The arrow 75 adjacent the blocking coil 27 is a polarity arrow used to indicate the direction of positive current flow (conventional) in the coil. Similar polarity arrows are used throughout the drawing. In the blocked condition, the flux in all portions of the material adjacent the apertures of each of the transfluxor cores 3 and 5 is oriented in the same one sense, with reference to their blocking apertures 7 and 9. In the following description, both for the system of Figure 1 and the other systems herein described, the exact nature of the flux flow is uncertain. However, a satisfactory explanation of the operation of these systems may be based on the flux flow as described.

Figure 2:
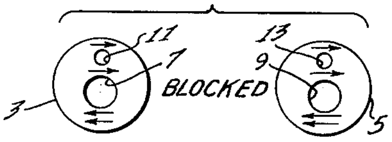
Figures 2–6 are symbolic drawings useful in explaining the operation of the system of Figure 1 and illustrating the flux configurations established by various signals applied to the transfluxor cores of Figure 1.

Figure 2 indicates, by arrows, the flux orientations in the portions of material adjacent the apertures 7, 11 and 9, 13 of the transfluxor cores 3 and 5 upon the termination of a blocking pulse 73. Application of a first drive pulse 77, in the direction of the arrow 79, to the first drive coil 51, does not produce any appreciable flux change in the path about the output apertures 11 and 13 of the first and second transfluxor cores 3 and 5. No appreciable flux change is produced, because one or the other of the narrow legs adjacent the output apertures 11 and 13 is already saturated with flux in the sense of the first drive pulse 77. Note, however, that the first drive pulse 77 is in a direction to produce a flux change along the longer path 71 of the second transfluxor core 5.

In order to prevent "spurious unblocking" of the second transfluxor core 5, the maximum value of the first drive pulse 77 is limited to a value less than that required to produce a flux change along the longer path 71 of the transfluxor 5. For transfluxors having dimensions as given above, in one successful embodiment the first drive pulse 77 was limited to a value less than that producing a net M.M.F. of approximately 1.1 ampere-turns along the longer path 71 of the transfluxor 5.

Application of a second drive pulse 81, in the direction of the arrow 83, to the second drive coil 57 does not produce any appreciable flux change in the path 63 about the output aperture 13 of the second transfluxor 5. Referring to Figure 2, it is seen that the upper leg adjacent the output aperture 13, and the lower, wide leg adjacent the blocking aperture 9, each is already saturated in the direction of the second drive pulse 81. Therefore, no substantial flux change is produced in any of the paths 63, 67, and 71 of the second transfluxor 5. The second drive pulse 81, then, may be as large as desired without "spuriously unblocking" either of the transfluxors 3 or 5.

The transfluxor system can be placed in a set condition by applying the setting pulse 83, in the direction of the arrow 85, to the setting coil 35. The setting pulse 83 causes a flux change in the paths 65 and 67 about the blocking apertures 7 and 9 of the transfluxor cores 3 and 5.

Figure 3:
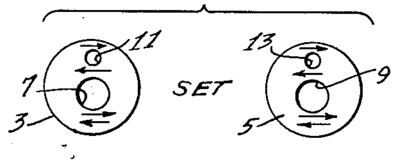

Figure 3 shows symbolically the flux orientation of the transfluxor cores 3 and 5 upon the termination of the setting pulse 83. Note that the flux in the paths 61 and 63 about the two output apertures 11 and 13 is now in the same sense, the clockwise sense, as indicated by the arrows adjacent these apertures.

As described in the aforementioned article, the setting pulse is advantageously followed by a priming pulse. The priming pulse reverses the flux in the paths 61 and 63 adjacent the output apertures 11 and 13. The function of the priming pulse is to permit the first and subsequent drive pulses following a setting pulse to be as large as may be desired without spuriously unblocking either one of the transfluxors 3 or 5. That is, by using a priming pulse, the subsequent drive pulses are then in a direction to drive the wide leg adjacent an output aperture further into saturation. Thus, no unblocking tendency is caused by the respective drive pulses insofar as the respective transfluxors are concerned. In prior systems, the priming operation is carried out rather slowly so as to prevent any appreciable load currents resulting from a flux reversal in the paths about the output apertures. However, in the present invention the priming operation may be carried out as fast as desired because substantially no load currents are caused to flow in the load circuit due to the cancelling voltages in the oppositely wound output windings 15 and 17. A priming pulse 87 is applied, in the direction of the arrow 89, to the priming coil 43 to reverse the flux in the paths 61 and 63 about the output apertures 11 and 13.

Figure 4:
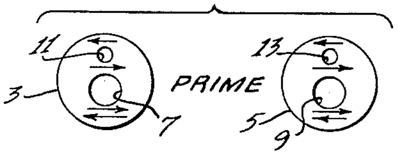

The diagram of Fig. 4 symbolically indicates the flux orientation in the respective portions of the material after the termination of the priming pulse 87.

Application of the first drive pulse 77 to the first drive coil 51 now produces a flux change in the path 61 about the output aperture 11 of the first transfluxor core 3. The voltage induced across the terminals of the output winding 15 of the first transfluxor core 3 causes a current $I_1$ to flow, in the direction of the arrow 91, in the output coil 19. The load current $I_1$ is prevented from producing any appreciable flux change in the path 63, about the output aperture 13 of the second transfluxor core 5, because the M.M.F. produced thereby is opposed by the M.M.F. produced by the first drive pulse 77 flowing through the first drive winding 49. However, the first drive current is limited to a maximum value because it is in a condition to produce a flux change in the longest path 71 about both the apertures 9 and 13 of the second transfluxor core 5 in the blocked condition, as described above. The maximum load current $I_1$ is limited to a value which produces a net M.M.F. required to produce a flux change along the path 63 of a transfluxor core 5. For example, in systems using a transfluxor core 5 of the previously assumed dimensions, the net M.M.F. required to produce a flux change in the path 63 is approximately 0.25 ampere-turn.

Figure 5:
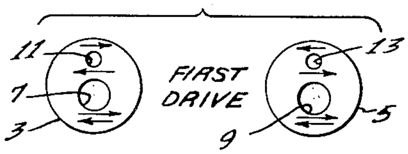

Figure 5 illustrates the flux configurations in the first and second transfluxors 3 and 5 upon the termination of the first drive pulse 77. Application of a second drive pulse 81 to the second drive coil 57 produces a flux reversal in the path 63 about the output aperture 13 of the second transfluxor core 5. This flux reversal induces a load current $I_2$, in the direction of the arrow 93, in the load coil 19.

Figure 6:
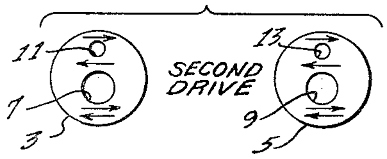

Figure 6 illustrates flux configurations of the first and second transfluxor cores 3 and 5 after the termination of the second drive pulse 81. Note that the load current $I_2$ does not tend to cause any flux reversal in the longest path 69 about the blocking and output apertures 7 and 11 of the first transfluxor core 3. Accordingly, the load current $I_2$ may be as large as desired because it is not in a direction to cause undesired flux reversals in the first transfluxor core 3.

Repeated applications of a sequence of a priming pulse, a first drive pulse, a second drive pulse, etc., induce a sequence of pairs of equal amplitude and opposite polarity output pulses $I_1$ and $I_2$ in the load circuit. A new blocking pulse 73 applied to the blocking coil 27 again places the first and second transfluxor cores 3 and 5 in a blocked condition, thereby preventing subsequent first and second drive pulses 77 and 81 from inducing currents in the load coil 19.

Note that, in the system of Fig. 1, the limiting feature is the magnitude of the first drive M.M.F. applied to the second transfluxor core 5 when it is in the blocked condition. Accordingly, the maximum symmetrical output is equal to, or less than, that produced by, say, 1.1 ampere-turns of M.M.F. applied to the second transfluxor core 5, if it is desired not to change any flux in the transfluxor core 5 at the first drive time. However, the setting, the priming, and the blocking operations can be as fast as desired without causing unwanted output or "noise" currents to be induced in the output coil 19. The number of turns in the first drive winding 49, linked through the output aperture 13 of the second transfluxor core 5, may be made less than the number of turns of the first drive winding 47 linked to the first transfluxor core 3. In such case, for cores of the assumed dimensions, the first drive pulse 77 can have any given amplitude sufficient to produce a load current $I_1$ generating a value of up to 1.1 ampere-turns through the load winding 15 of the first transfluxor core 3 when the system is in its set condition. At the same time, however, this first drive pulse 77 is of an amplitude insufficient to produce a magnetizing force of greater than 1.1 ampere-turns through the first drive winding 49 of the second transfluxor core 5 when the system is in its blocked condition. Accordingly, symmetrical output currents $I_1$ and $I_2$, each producing and M.M.F. of up to 1.1 ampere-turns through the load windings 15 and 17 can be obtained, using transfluxor cores of the assumed dimensions, and without producing undesired flux changes in the transfluxor cores 3 and 5.

Figure 7:
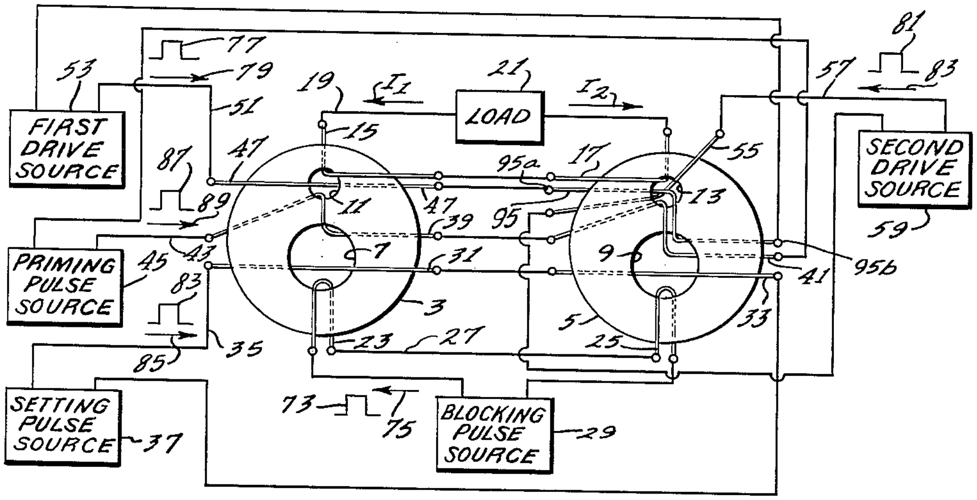

The embodiment of Fig. 7 illustrates another system for obtaining relatively large amplitude, symmetrical load currents $I_1$ and $I_2$ in the output circuit. In this embodiment, a first drive winding 95 is linked through both the output and the blocking apertures 13 and 9 of the second transfluxor core 5. The first drive winding 95, beginning at its terminal 95*a*, is threaded upwardly through the output aperture 13 of the second transfluxor core 5, then across its top surface, then downwardly through its blocking aperture 9, and then across the bottom surface of the transfluxor core 5 to the terminal 95*b* of the winding 95. The first drive coil 51 connects the first drive winding 47 of the transfluxor core 3 and the first drive winding 95 of the second transfluxor core 5 in a series circuit including the first drive source 53. Otherwise, the circuit connections of the system of Fig. 7 are the same as those described for the system of Fig. 1.

In the blocked condition, a first drive pulse 77, flowing through the first drive winding 95 of the second transfluxor core 5, tends to drive the center leg and the wide leg of the transfluxor core 5 in a direction in which they are already saturated. Thus, a first drive pulse 77 does not tend to "spuriously unblock" the second transfluxor core 5. This effect should be contrasted with the system of Fig. 1 where the first drive pulse does tend to "spuriously unblock" the second transfluxor core 5.

A second drive pulse 81, applied to the second drive coil 57, is not in a direction to produce "spurious unblocking" of the second transfluxor core 5. Thus, the second drive pulse 81 also may be as large as is desired.

In the set condition, a first drive pulse 77 produces a flux reversal in the path about the output aperture 11 of the first transfluxor core 3. This flux reversal causes a load current $I_1$ in the load coil 19. The load current $I_1$ and the first drive current 77 generate opposite polarity M.M.F.'s in the material about the output aperture 13 of the second transfluxor core 5; and, in the situation where equal M.M.F.'s are generated by the load current $I_1$ and the drive current 77, there is no net magnetizing force acting on the flux path which encompasses the output aperture 13 of the second transfluxor core 5. However, the first drive current 77 flowing through the blocking aperture 9 of the second transfluxor core 5 is in a direction to produce a flux reversal in the longest path about both the blocking aperture 9 and the output aperture 13. Accordingly, for transfluxor cores of the assumed dimensions, the magnetizing force generated by the first drive current 77 is limited to a value equal to or less than 1.1 ampere-turns, where 1.1 ampere-turns are required to produce a flux change about both the apertures 9 and 13. Application of a second drive current 81 to the second drive coil 57 produces a flux reversal about the output aperture 13 of the second transfluxor core 5. This flux reversal causes a current $I_2$ which may have the same amplitude as, and is of a polarity opposite from, the load current $I_1$. Thus, in the system of Fig. 7, relatively large, symmetrical load currents can be obtained in the load circuit by applying sequences of first and second drive currents to the transfluxor cores 3 and 5.

In the system of Fig. 7, the magnitude of the symmetrical load currents again is limited to some maximum value. The limitation arises because the first drive current 77 tends to "spuriously block" the second transfluxor core 5 when it is in the set condition. In the system of Fig. 7, values of first and second drive currents 77 and 81 can be substantially equal to those which produce approximately 1.1 ampere-turns of load currents $I_1$ and $I_2$ when using transfluxor cores of the assumed dimensions. Thus, in either of the systems of Figs. 1 and 7, relatively large values of symmetrical, bipolarity output currents can be obtained.

Figure 8:
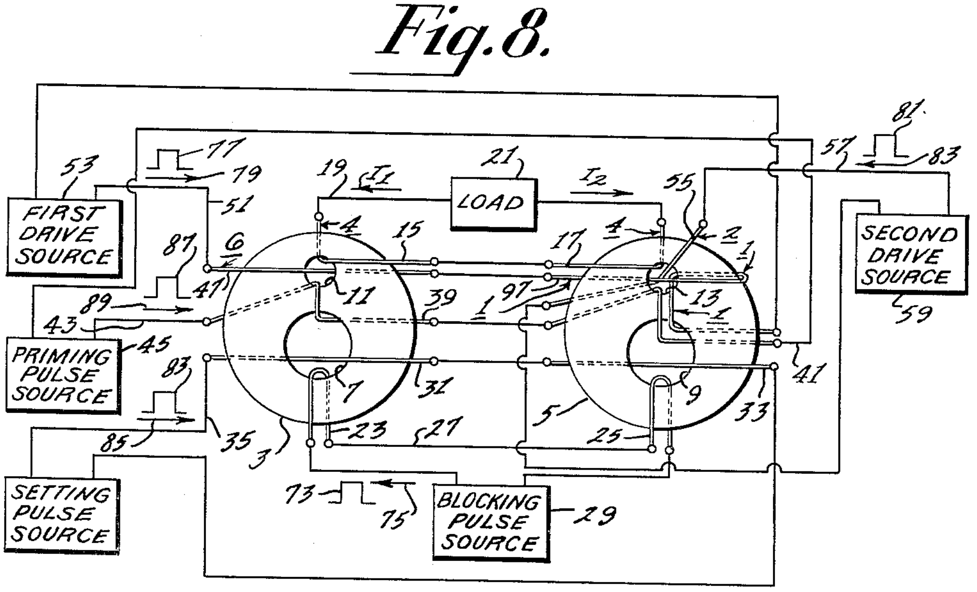

The system of Fig. 8 combines the winding arrangements of both the systems of Figs. 1 and 7. Thus, the second transfluxor core 5 is linked by a first drive winding 97 which, for example, is linked through the output aperture 13 of the second transfluxor core 5 with twice the number of turns with which it is linked through the blocking aperture 9 thereof.

The remaining elements of the system of Fig. 8 are similar to those of the systems of Figs. 1 and 7. For purposes of illustration, the number of turns with which the first and second drive windings 97 and 55 and the output windings 15 and 17 may link the first and second transfluxor cores 3 and 5 respectively, are indicated in the drawing by the underlined numbers located adjacent to the respective windings. The first drive winding 47 may have six turns linked through the output aperture 11 of the first transfluxor core 3. The first drive winding 97 of the transfluxor core 5 may have two turns linked through the output aperture 13 thereof, and a single turn linked through the blocking aperture 9 thereof. Each of the output windings 15 and 17 may have four turns linked through the respective output apertures 11 and 13.

In the blocked condition, the first drive pulse 77 applied to the first drive coil 51 may have a value sufficiently large to produce a current generating an M.M.F. of up to 2.2 ampere-turns in the load windings 15 and 17. A larger amount of first drive current is permitted because, in the blocked and in the set conditions, the net ampere-turns of the first drive current 77, acting on the longest path about the blocking and output apertures 9 and 13 of the second transfluxor core 5, is 1.1 ampere-turns. Thus, in the blocked condition the 2.2 ampere-turns acting through the output aperture 13 of the second transfluxor core 5 are opposed by the 1.1 ampere-turns acting through its blocking aperture 9. In the set condition, the load current $I_1$ and the first drive current 77 each produce an M.M.F. of 2.2 ampere-turns through the output aperture 13 of the second transfluxor core 5. These two M.M.F.'s cancel each other, leaving a net M.M.F. of 1.1 ampere-turns through the blocking aperture 9 of the transfluxor core 5. The second drive pulse 81, applied to the second drive coil 57, can be made arbitrarily large, for example, sufficiently large to produce 2.2 ampere-turns of current $I_2$ in the load coil 19. The load current $I_2$ can be arbitrarily large because it is not in a direction to produce any flux reversals in the previously driven transfluxor core 3.

Accordingly, in the system of Fig. 8, the symmetrical load currents $I_1$ and $I_2$, for example, each may have a value which produces 2.2 ampere-turns of M.M.F. in the load coil 19, a value twice as great as either of the systems of Figs. 1 and 7.

Furthermore, in the system of Fig. 8, for example, the maximum amplitude of output current $I_1$ can be increased by decreasing both the rise time and the duration of the first drive current 77. However, in such case the "discrimination" between the blocked and the set conditions is poorer and a larger amount of "spurious blocking" is produced in the second transfluxor core 5 due to a lesser amount of cancellation between the first drive M.M.F. and output M.M.F. By "discrimination" is meant the ratio between the output currents $I_1$ produced in the set and the blocked conditions respectively. For example, in successful operation of a system using transfluxor cores of the assumed dimensions, a first drive current 77 of 1.1 ampere-turns and of approximately two microseconds duration was applied through the output aperture 11 of the first transfluxor core 3. This drive current produced a load current $I_1$ of 0.7 ampere (=2.8 ampere-turns) in the output coil 19. The discrimination ratio between the set and the blocked conditions for such a drive current was approximately 8-to-1. The 8-to-1 discrimination ratio results because the compensation of the second transfluxor core 5 is not perfect over the entire range of output current, and some slight flux reversal is produced in the second transfluxor core 5 when the first drive current 97 is applied. By increasing the resistance of the load device 21 so as to reduce the amplitude of the load current $I_1$ to a value of 0.5 ampere (=2 ampere-turns), the discrimination ratio can be increased to approximately 13-to-1, and substantially no "spurious blocking" of the second transfluxor core 5 is produced. When a first drive current 77 having a faster rise time and a shorter duration, i.e., 1 microsecond, was used to produce a 1.1 ampere (=4.4 ampere-turns) load current $I_1$, the discrimination ratio was approximately 4-to-1. Thus, larger magnitudes of load currents can be obtained by employing relatively short-duration first drive currents, provided the resulting reduction in the discrimination ratio is tolerable.

Figure 9:
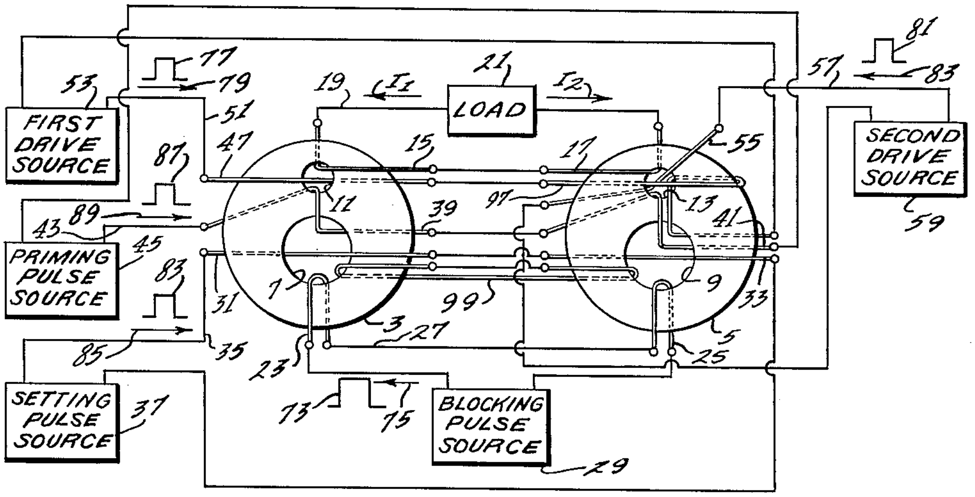

For relatively short-duration first drive currents, the amount of "spurious blocking" of the second transfluxor core 5 can be reduced, as shown in Fig. 9, by coupling a short-circuited coil 99 through the blocking apertures 7 and 9 of the two transfluxor cores 3 and 5. The blocking, the setting, and the priming pulses induced voltages of opposite polarities in the shorted coil 99, so that effectively no current is produced therein during the application of these pulses. However, any "spurious blocking," produced by the first drive pulse 77 in the second transfluxor core 5, is opposed by a current induced in the shorted coil 99 by the flux change in the second transfluxor core 5. It is found that, for a system employing transfluxor cores of the assumed dimensions, approximately a 50 percent reduction in the "spurious blocking" of the second transfluxor core 5 can be achieved.

Figure 10:
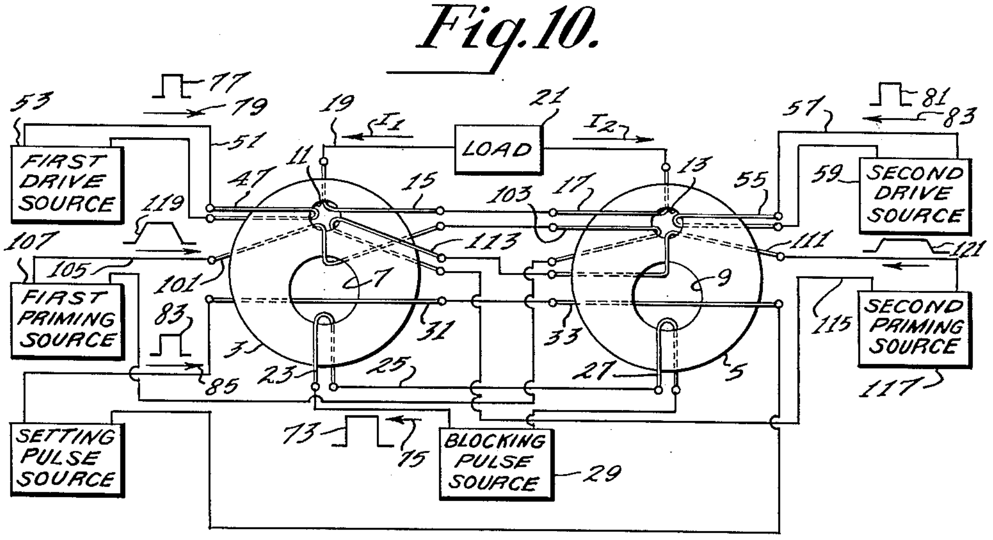

Increased amounts of load currents $I_1$ and $I_2$ can be produced by employing a separate priming source for priming the second transfluxor core 5. In the system of Fig. 10, a first priming winding 101 is linked through the blocking and output apertures 7 and 11 of the first transfluxor core 3, and another first priming winding 103 is linked through the output aperture 13 of the second transfluxor core 5. A first priming coil 105 connects the two first priming windings in a series circuit including a first priming source 107. A second priming winding 111 is linked through the output and the blocking apertures 13 and 9 of the second transfluxor core 5, and another second priming winding 113 is linked through the output aperture 11 of the first transfluxor core 3. A second priming coil 115 connects the two second priming windings 111 and 113 in a series circuit including a second priming source 117. The first drive winding, after linking the output aperture 11 of the first transfluxor core 3, has both its terminals connected to the first drive source 53 by means of the first drive coil 51. Otherwise, the remaining windings of the system of Fig. 10 are linked to the transfluxor cores 3 and 5 in the manner described for the corresponding windings of the system of Fig. 1.

In operation, the pulse schedule may be a block pulse, a set pulse or no set pulse, a first priming pulse, a first drive pulse, a second priming pulse, a second drive pulse, etc.

In the blocked condition, both the first and second drive currents 77 and 81 are in a direction to drive the transfluxor cores 3 in a direction in which the cores are already saturated with flux. Therefore, the first and second drive currents 77 and 81 may be as large as desired without producing "spurious unblocking" of either of the transfluxor cores 3 and 5. The priming currents, however, tend to produce undesired flux changes in one or the other of the transfluxor cores 3 and 5, as described hereinafter.

In the set condition, the first priming pulse 119 reverses the flux in the path about the output aperture 11 of the first transfluxor core 3. This flux reversal causes a current, in the direction of the current $I_2$, to flow in the load coil 19. This current is in a direction to cause "spurious priming" of the second transfluxor core 5. However, the priming current 119, flowing in the first priming winding 103 of the second transfluxor core 5, acts to oppose any flux change that may be produced in the second transfluxor core 5, by the current produced in the load coil 19, when the first transfluxor core 3 is being primed. The amount of current produced in the load circuit by the priming pulse 119 can be reduced by increasing the rise time and the duration of the priming pulse 119.

The first drive pulse 77, following the first priming pulse 119, reverses the flux in the path about the output aperture 11 of the first transfluxor core 3 back to the initial set condition, thereby producing a load current, in the direction of the current $I_1$, in the load coil 19. Note that the load current $I_1$ does not tend to reverse the flux about the output aperture 13 of the second transfluxor core 5. Consequently, it is not necessary to provide compensation to prevent undesired flux changes in the second transfluxor core 5 due to the load current $I_1$. Thus, the load current $I_1$ may be as large as desired.

A second priming pulse 121 is applied to the second priming coil 115 after the first drive pulse 77. The second priming pulse 121 produces a flux change in the path about the output aperture 13 of the second transfluxor core 5. This flux reversal causes current, in the direction of the current $I_1$, to flow in the load coil 19. This current is in a direction to cause a flux change in the path about the output aperture 11 of the first transfluxor core 3. However, flux changes in the first transfluxor core 3, due to the priming of the second transfluxor 5, are prevented by the second priming current that flows at the same time in the second priming winding 113 of the first transfluxor core 3.

The second priming pulse 121 is followed by a second drive pulse 121 which reverses the flux in the path about the output aperture 13 of the second transfluxor core 5 back to the initial set condition. This flux reversal causes a load current, in the direction of the current $I_2$, to flow in the load coil 19. However, the load current $I_2$ is not in a direction to produce undesired flux reversals in the first transfluxor core 3. The load current $I_2$, therefore, may be as large as desired.

Accordingly, by extending the system arrangement to include a second priming source, and by compensating for undesired flux changes that may be produced by the first and second priming pulses, arbitrarily large, symmetrical load currents can be supplied to the load device 21. The blocking and the setting pulses may be applied as fast as desired because of the voltage cancellations produced in the output coil 19 when these pulses are applied.

The embodiment of Fig. 11 illustrates a system, according to the invention, for obtaining relatively large, symmetrical load currents employing a single three-aperture transfluxor core 130. The functions of the separate two-aperture transfluxor cores 3 and 5 of the previously described systems of the invention are combined in the system of Fig. 11. A relatively large blocking aperture 131 is common to two smaller diameter apertures 133 and 135 which are symmetrically located in the material between the blocking aperture 131 and the periphery of the disc 130. The cross-section of material between the two output apertures 133, 135 is designated as the leg $l_5$, and is at least equal to the sum of the cross-sectional areas, at their most restricted portions, of the material between the respective output apertures 133, 135 and the edge of the disc 130. The legs $l_1$ and $l_2$ are used respectively to designate the cross-sections of material between the inside surface of the first output aperture 133 and the outer and inner surfaces, respectively, of the disc 130. The legs $l_4$ and $l_3$ are used similarly to designate the cross-sections of material adjacent the second output aperture 135 at the outer and inner radial portions, respectively, of the disc 130. The legs $l_1$ through $l_4$ are preferably equal to each other at their most restricted portions. The cross-section of material between the inside surface of the blocking aperture 131 and the periphery of the disc 130 is designated as the leg $l_6$. The cross-sectional area of the leg $l_6$ is made equal to, or greater than, the sum of the areas of the legs $l_1$, $l_2$ or $l_3$, $l_4$. The wide leg $l_5$ between the two output apertures 133, 135 provides sufficient material to have separate flux paths about the two output apertures.

A first drive winding 137 is linked to the transfluxor core 130 through the first output aperture 133; and another first drive winding 139 is linked to the transfluxor core 130 through the second output aperture 135. A first drive coil 141 connects the two first drive windings 137 and 139 in a series circuit including a first drive source 143. A second drive winding 145 is linked to the transfluxor core 130 through the second output aperture 135. The terminals of the second drive winding 145 are connected to a second drive source 147. A priming coil 136 is linked to the transfluxor core 130 through both output apertures 133 and 135. The terminals of the priming coil 136 are connected to a priming source which may be the same as any one of the previously described priming-pulse sources but which, for convenience of drawing, is not shown. A blocking winding 149 and a setting winding 151 are each linked to the transfluxor core 130 through the blocking aperture 131. The terminals of the blocking winding 149 are connected to a blocking source 153, and the terminals of the setting winding 151 are connected to a setting pulse source 155. A pair of output windings 138 and 140 are linked to the transfluxor core 130 through the output apertures 133 and 135, respectively. An output coil 142 connects the pair of load windings 138 and 140 in a series circuit including a load device 144. Each of the windings is shown as a single-turn winding (except the first drive windings 137 and 139 which have two turns each) for convenience of drawing. However, it is understood that each may be a multi-turn winding, if desired.

To obtain the desired, relatively large, amounts of symmetrical output, the winding arrangements are made to satisfy two conditions. A first of the two conditions is that the first drive current does not produce "spurious unblocking" when the system is in a blocked condition; and the second is that any load current resulting from a flux reversal about the first output aperture, during the first drive operation, does not produce an undesired flux change in the material about the second output aperture 135.

The flux configurations in the material adjacent the respective apertures, upon the termination of each of the respective operating signals applied to the device, are indicated by the symbolical diagrams 12*a*–12*e* of Fig. 12. After the blocking pulse 157 of Fig. 1 is terminated, the flux may be oriented in the clockwise sense in all the portions of the transfluxor core, as indicated by the arrows of Fig. 12*a*. The flux orientation produced in the transfluxor core 130 by any given operating signal can be determined by using the well-known "right-hand rule." In the blocked condition, neither a first drive current 159 nor a second drive current 161 produces any appreciable flux change in the transfluxor core 130. Therefore, no appreciable current is caused to flow in the output circuit. A setting pulse 163, applied to the setting coil 151, reverses the flux in the legs $l_2$, $l_3$, and a like amount of flux in the leg $l_6$, from the clockwise to the counterclockwise sense, as indicated in Fig. 12*b*. The flux flow in the separate paths about the output apertures 133 and 135 are now in the same clockwise sense with reference to the respective output apertures. A priming pulse 165, applied to the priming coil 136, reverses the flux in each of the paths about the output apertures 133 and 135 to the counterclockwise sense, as indicated in Fig. 12*c*. A subsequent first drive pulse 159 reverses the flux about the first output aperture 133 back to the clockwise sense, thereby causing a load current, in the direction of the current $I_1$, in the output coil 142. Fig. 12*d* indicates the flux orientation in the transfluxor core 130 after the first drive current 159 is terminated. The load current $I_1$ is prevented from producing a flux change in the path about the second output aperture 135 by the opposing magnetizing force generated by the first drive current 159 which flows at the same time in the first drive winding 139 of the second output aperture 135.

The amount of M.M.F. produced in the second output aperture 135 by the first drive current 159 is made equal to, or greater than, the M.M.F. produced therein by the output current $I_1$, or $$(1) \qquad I_A \times N_4 \geqslant I_1 \times N_5$$

where $I_A$ and $I_1$ are, respectively, the magnitudes of the first drive current 159 and the load current $N_4$ and $N_5$ are, respectively, the number of turns of the first drive winding 139 and the output winding 138. The inequality relation of Equation 1 assures that substantially no flux reversal is produced in the path about the second output aperture 135 as a result of the load current $I_1$. However, the M.M.F. produced by the first drive current 159 in the second output aperture 135 is limited to some maximum value. This limitation arises during the blocked unset condition because "spurious unblocking" may be caused along a path including the legs $l_4$, $l_6$, $l_2$, and $l_5$, if the first drive M.M.F. is excessive. The change of flux along this longer path tends to unblock the path about the second output aperture 135 by changing the direction of flux in the leg $l_4$. For convenience, this allowable maximum value of M.M.F. produced in the second output aperture 135 by the first drive current is termed "X"; then from 1 above (2) $$\text{"}X\text{"}=I_A'\times N_4 \geqq I_1'\times N_5$$

where $I_A'$ is the maximum allowable first drive current $I_A$, and $I_1'$ is the output current produced thereby.

If the number of turns $N_4$ in the first drive winding 139 is made equal to the number of turns $N_5$ in the output winding 138, then from 2 above, (3) $$I_A' \geqq I_1'$$

A subsequent second drive current 161 then reverses the flux in the path about the second output aperture 135 back to the initial set clockwise sense. This flux reversal causes a load current, in the direction of the current $I_2$, in the output coil 142. Fig. 12*e* indicates the flux configuration in the transfluxor core 130 after the second drive current 161 is terminated. Note that the output current $I_2$ does not tend to reverse the flux in the path about the first output aperture 133. Thus, the load current $I_2$ can be as large as desired.

Accordingly, relatively large symmetrical output currents $I_1$ and $I_2$ can be produced in the output circuit by applying pairs of drive pulses 159 and 161 to the first and second drive coils 141 and 145. Each pair of drive pulses may be followed by a new priming pulse 165 and the schedule of first and second drive, and priming pulses continued for an indefinitely long time producing an indefinitely long sequence of symmetrical output currents $I_1$ and $I_2$.

The winding arrangement of the system of Fig. 13 also may be used to obtain relatively large amplitude, symmetrical currents in the output coil 142. The arrangement of Fig. 13 is similar to that of Fig. 11 except that a first drive winding 165 of $N_3$ turns is linked to the transfluxor core 130 through the second output aperture 135 and the blocking aperture 131. The first drive coil 137 connects the first drive winding 137 of the first output aperture 133 and the first drive winding 165 of the second output aperture 135 in a series circuit including the first drive source 143. To prevent a load current, in the direction of the current $I_1$, from producing a flux reversal in the path about the second output aperture 135, the number of turns $N_3$ of the first drive winding 165 is made equal to or greater than the number of turns $N_5$ of the load winding 138, or (4) $$I_A\times N_3 \geqq I_1\times N_5$$

Again, the first drive current $I_A$ is limited to some maximum value. This maximum value again arises because of the possibility of "spurious blocking" of the path about the second output aperture 135. Assume, for example, that the load current is arranged to have a maximum value so that $I_1\times N_5=I_A\times N_3$. In such case there is zero net M.M.F. in the second output aperture 135, but there is an M.M.F. $I_A\times N_3$ in the blocking aperture 131. The M.M.F. $I_A\times N_3$ in the blocking aperture tends to switch flux along a path including the legs $l_2$, $l_5$, $l_4$, and $l_6$. For convenience of explanation, assume this maximum value of first drive current $I_A$ to be equal to a value $I_A''$ and the resulting load current $I_1$ to be equal to a value $I_1'$, then from 4 above, (5) $$I_A''N_3 \geqq I_1'N_5, \text{ and if } N_3=N_5$$

(6) $$I_A'' \geqq I_1'$$

In the blocked condition, the M.M.F. $I_A''\times N_3$ does not tend to produce "spurious unblocking" because it is in a direction to drive both the legs $l_1$ and $l_3$ further into saturation in the direction in which they are already saturated. Thus, no appreciable flux changes are caused in any of the paths along which the M.M.F. $I_A''\times N_3$ acts.

The winding arrangements of the systems of Figs. 12 and 13 may be combined in the system of Fig. 14 to provide a maximum output current $I_1''$ equal to the sum of the maximum output currents of either of the systems of Figs. 12 and 13. The system of Fig. 14 has a first drive winding 167 wound on each of the legs $l_4$ and $l_3$ adjacent the second output aperture 135 with $N_4$ and $N_3$ turns, respectively. The first drive coil 141 connects the first drive winding 167 of the second output aperture in a series circuit including the first drive source 143. The remaining system elements may be arranged similarly to those of Fig. 13. An equal number of turns may be used for each of the windings $N_3$ and $N_4$ of the first drive winding 167. Accordingly, the maximum allowable M.M.F. (X'') produced by the first drive current 159 in the second output aperture 135 before "spurious blocking" occurs is, (7) $$X''=I_A''\times N_4+I_A''\times N_3$$

where "X" represents the maximum allowable M.M.F. and $I_A''$ is the first drive current producing the M.M.F. "X".

Thus, if $N_4=N_3$, then from 7, (8) $$X''=2I_A''N_3$$

and from 2 and 4 above (9) $$2I_A''N_3 \geqq I_1''N_5$$

If the number of turns $N_5$ in the output winding 138 is equal to the number of turns $N_3$ of the first drive winding 167, then from 9, $$I_1'' \leqq 2I_A''$$

Thus, in the system of Fig. 14, the useful load current may be approximately equal to twice the amount producing "spurious blocking" for an uncompensated transfluxor core 130. The second drive current can be made as large as desired to produce an opposite polarity load current $I_2''$ of the same magnitude as the load current $I_1''$. The operating schedule for the system of Fig. 14 may be the same as for the systems of Figs. 11 and 13, above described.

If the durations of the first and second drive currents 159 and 161 are made shorter, then symmetrical load currents having amplitudes greater than the load currents $I_1''$ and $I_2''$ can be obtained, as described, for example, in the arrangements of the system of Fig. 1.

Also, first and second priming sources may be used for separately priming the flux paths about the first and second output apertures 133 and 135, as described for the embodiment of Fig. 10 where compensation was effected during the priming operation. In such case, output currents of arbitrarily large amplitudes can be obtained during the first and second drive operations.

It may be noted that, if desired, the second drive coil can be linked to the first transfluxor core in the same manner as described for the linkage of the first drive coil to the second transfluxor core. In such case, an arbitrary drive sequence can be used to obtain an arbitrary sequence of the two output currents. Thus, if first and second drive signals are applied in that order to the system, the first and second load currents $I_1$ and $I_2$ are produced in that order. If the ordering of the two drive signals is reversed, second drive and then first drive, the output current $I_2$ is produced before the output current $I_1$. The linkage of the second drive coil to the first transfluxor core prevents the load current $I_2$ from producing undesired flux changes in the first transfluxor core when the second drive signal precedes the first drive signal.

There have been described herein improved magnetic systems using transfluxor cores for controlling relatively large, symmetrical currents in an output circuit linked to the transfluxor cores. An indefinitely long sequence of symmetrical outputs can be controlled by a single setting pulse applied to a setting winding linked to the transfluxor cores. The "analogue" property of a transfluxor core, described in the above-mentioned Rajchman and Lo article, may be employed in the present invention. Thus, the amount of symmetrical output can be varied by varying the amount of the setting signal applied to the setting winding.

What is claimed is:

1. In a magnetic system, the combination comprising magnetic material of substantially rectangular hysteresis loop characteristics having apertures therein, an output circuit linked in opposite senses to said material about a first and a second of said apertures, a third aperture adjacent to said second aperture, a first winding linked to one portion of said material about said first aperture and further threaded through both said second and third apertures to link a different portion of said material between said second and third apertures, a second winding linked to said material about said second aperture, and separate means for applying to said first and second windings alternate drive signals to produce, respectively, the one and the other polarity output signals in said output circuit.

2. In a magnetic system, the combination as recited in claim 1, including first and second cores of substantially rectangular hysteresis loop material, said first aperture being located in said first core and said second and third apertures being located in said second core.

3. In a magnetic system, the combination as recited in claim 1, including a single core of substantially rectangular hysteresis loop material.

4. In a magnetic system, the combination comprising magnetic material of substantially rectangular hysteresis characteristics having a plurality of apertures therein, an output circuit linked to portions of said material about a first and a second of said apertures, a third aperture adjacent to said second aperture, a first drive winding linked to one portion of said material about said first aperture and linked to another portion of said material about said second aperture and further threaded through both said second and third apertures to link a different portion of said material between said second and third apertures, and a second winding linked to said material about said second aperture.

5. In a magnetic system, the combination as recited in claim 4, including first and second cores of substantially rectangular hysteresis loop material, said first aperture being located in said first core and said second and third apertures being located in said second core.

6. In a magnetic system, the combination as claimed in claim 4, including a single core of substantially rectangular hysteresis loop material.

7. In a magnetic system, the combination comprising magnetic material of substantially rectangular hysteresis characteristics having a plurality of apertures therein, an output circuit linked to portions of said material about a first and a second of said apertures, a third aperture adjacent to said second aperture, and a fourth aperture adjacent to said first aperture, and winding means linked to said material about said third and fourth apertures, said winding means being connected in a closed loop.

8. In a magnetic system, the combination comprising magnetic material of substantially rectangular hysteresis characteristics having a plurality of apertures therein, an output circuit linked to said material above a first and a second of said apertures, first and second windings linked to said material about said first and second apertures, respectively, third and fourth apertures respectively adjacent to said first and second apertures, a third winding linked to one portion of said material about said first and third apertures and linked to another portion of said material about said second aperture, and a fourth winding linked to one portion of said material about said second and fourth apertures and linked to still another portion of said material about said first aperture.

9. In a magnetic system, the combination comprising a core of substantially rectangular hysteresis loop material having a plurality of apertures, a first of said apertures being a relatively larger inner aperture and a second and a third of said apertures each being relatively smaller outer apertures, winding means linked to said core through said first aperture for producing selectively flux changes in the material adjacent to said second and third apertures, an output circuit linked to said core through said second and third apertures, said output circuit having substantially equal cancelling voltages induced therein as a result of flux changes caused by signals applied to said winding means, a first winding linked to said core through said second and third apertures, the flux changes in the material adjacent to said second aperture caused by signals applied to said first winding producing one polarity of signal in said output circuit, and said signal in said first winding operating to prevent said one polarity output signal from causing flux changes in the material adjacent to said third aperture, said first winding additionally linking said core through said first and third apertures in a sense such that a signal applied to said first winding is prevented from producing a flux change in the material adjacent to said first aperture in the absence of said one polarity output signal, and a second winding linked to said core through said third aperture, whereby the flux changes in the material adjacent to said third aperture caused by signals applied to said third winding induce signals of a polarity opposite the one polarity in said output circuit.

10. In a magnetic system, the combination comprising magnetic material of substantially rectangular hysteresis loop characteristics having therein first and second flux paths, a first winding linked to both said paths, an output winding linked to both said paths, means for applying an electrical signal to said first winding, said first winding linking said paths in such a sense that an output signal, due to a flux reversal along said first path as the result of said applied electrical signal, is in a direction to cause a flux change in said second path, and wherein said second flux path change is opposed by said electrical signal in said first winding, and a second winding linked to said second path for producing a flux reversal along said second path.

11. In a magnetic system, the combination as claimed in claim 10, including first and second cores of substantially rectangular hysteresis loop material, said first flux path being in said first core and said second flux path being in said second core.

12. In a magnetic system, the combination as claimed in claim 10, and including a core of substantially rectangular hysteresis loop material, said core having a plurality of apertures in said material, said first flux path being taken about a first of said apertures and said second flux path being taken about a second of said apertures.

13. In a magnetic system, the combination of a plurality of flux paths in a substantially rectangular hysteresis loop material, means for establishing saturating flux in each of said paths in desired senses, said desired senses including saturating flux in one sense in all portions of a path, saturating flux in the opposite sense in all portions of a path, and saturating flux in one sense in one portion of a path and saturating flux in the opposite sense in a different portion of the same one path, an output circuit linked to a first and second of said plurality of paths, a first winding linking each of said first and second paths, said first winding linking said second path so as to prevent flux changes along said second path by an output signal produced in said output circuit by a flux reversal along said first path, and a second winding linked to said second path for producing a flux reversal along said second path, said flux reversals in said first and second paths producing opposite-polarity output signals in said output circuit.

14. In a magnetic system, the combination as claimed in claim 13, including first and second cores of substantially rectangular hysteresis loop material, said first flux path being located in said first core and said second flux path being located in said second core.

15. In a magnetic system, the combination as claimed in claim 13, and including a core of substantially rectangular hysteresis loop material, said core having a plurality of apertures in said material, said first flux path being taken about a first of said apertures and said second flux path being taken about a second of said apertures.

16. In a magnetic system for producing opposite-polarity outputs in an output circuit in response to first and second drive signals, the combination of first and second cores of substantially rectangular hysteresis loop magnetic material, each of said cores having a plurality of apertures in said material, a first coil for receiving said first drive signal, said first coil and said output circuit each linking said first and second cores, said linkages of said output circuit and said first coil to said second core being such that substantially equal and opposite magnetizing forces are applied to said second core when one output signal is produced in said output circuit by said first drive signal, and a second coil for receiving said second drive signal, said second coil being linked to said second core such that an output signal of the opposite polarity is induced in said output circuit when said second drive signal is applied to said second drive coil.

17. In a magnetic system having first and second response conditions, the combination of an output circuit linked to first and second flux paths each in substantially rectangular hysteresis loop material, a third flux path in said material, said second and third flux paths each having a portion in common, a first coil linked to each of said flux paths, said first coil linking said second flux path so as to prevent flux changes along said second path by an output signal produced in said output circuit by a flux reversal along said first path when said system is in its first response condition, and said first coil being linked to said third path so as to prevent flux changes along said third path by signals applied to said first coil when said system is in its second response condition, and a second coil linking said second path for producing a flux reversal along said second path when said system is in its first response condition.

18. In a system for producing symmetrical outputs of the one and the other polarities in an output circuit, the combination comprising a transfluxor core having a plurality of apertures, said output circuit being linked through a first and a second of said plurality of apertures, a first drive winding linked through said first and second apertures, and a second drive winding linked through said second aperture, said one and the other polarity outputs being produced when signals are applied to said first and second drive windings, respectively, and said first drive winding being linked through said second aperture in a sense to oppose flux changes in the material about said second aperture when said one polarity output is produced in said output circuit.

19. In a magnetic system, the combination comprising magnetic material of substantially rectangular hysteresis characteristics having a plurality of apertures therein, an output circuit linked to portions of said material about a first and second of said apertures, a third aperture adjacent to said second aperture, a first drive winding linked to one portion of said material about said first aperture and linked to another portion of material about said second aperture and further threaded through both said second and third apertures to link a different portion of said material between said second and third apertures, said first drive winding being linked to said different portion with a greater number of turns than are used to link said first drive winding to said other portion of material, and a second winding linked to said material about said second aperture.

References Cited in the file of this patent

UNITED STATES PATENTS

| | | |
|---|---|---|
| 2,519,426 | Grant | Aug. 22, 1950 |
| 2,733,424 | Chen | Jan. 31, 1956 |
| 2,803,812 | Rajchman | Aug. 20, 1957 |

FOREIGN PATENTS

| | | |
|---|---|---|
| 881,089 | Germany | June 25, 1953 |